(12) United States Patent
Laib

(10) Patent No.: US 7,029,065 B2
(45) Date of Patent: Apr. 18, 2006

(54) VENTILATED SEATING SYSTEM WITH IMPROVED LOW PRESSURE PERFORMANCE

(75) Inventor: Trevor M. Laib, Bellevue, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/366,138

(22) Filed: Feb. 13, 2003

(65) Prior Publication Data

US 2004/0160092 A1 Aug. 19, 2004

(51) Int. Cl.
*A47C 7/74* (2006.01)

(52) U.S. Cl. .............................. 297/180.13; 297/180.14

(58) Field of Classification Search ............. 297/180.1, 297/180.13, 180.14, 452.42; 5/652.1, 652.2; 219/217
See application file for complete search history.

(56) References Cited

U.S. PATENT DOCUMENTS

| | | | | |
|---|---|---|---|---|
| 1,514,329 A | * | 11/1924 | Metcalf | 454/120 |
| 4,819,720 A | | 4/1989 | Howard | |
| 4,946,220 A | * | 8/1990 | Wyon et al. | 297/180.13 |
| 5,102,189 A | | 4/1992 | Saito et al. | |
| 5,261,855 A | * | 11/1993 | Law et al. | 454/76 |
| 5,403,065 A | | 4/1995 | Callerio | |
| 5,450,894 A | * | 9/1995 | Inoue et al. | 165/43 |
| 5,918,930 A | * | 7/1999 | Kawai et al. | 297/180.13 |
| 5,921,858 A | * | 7/1999 | Kawai et al. | 454/120 |
| 5,924,767 A | | 7/1999 | Pietryga | |
| 6,003,950 A | | 12/1999 | Larsson | |
| 6,109,688 A | * | 8/2000 | Wurz et al. | 297/180.14 |
| 6,196,627 B1 | * | 3/2001 | Faust et al. | 297/180.14 |
| 6,247,751 B1 | * | 6/2001 | Faust et al. | 297/180.13 |
| 6,277,023 B1 | * | 8/2001 | Schwarz | 454/120 |
| 6,578,910 B1 | * | 6/2003 | Andersson et al. | 297/180.11 |
| 2001/0035669 A1 | | 11/2001 | Andersson et al. | |
| 2002/0096915 A1 | | 7/2002 | Haupt et al. | |

FOREIGN PATENT DOCUMENTS

| | | | |
|---|---|---|---|
| DE | 3609095 A1 | * | 10/1986 |
| EP | 0834420A1 A1 | | 4/1998 |
| IT | 0407362 A1 | * | 1/1991 |
| WO | WO99/48756 A1 | | 9/1999 |
| WO | WO00/18606 A1 | | 4/2000 |

* cited by examiner

*Primary Examiner*—Peter M. Cuomo
*Assistant Examiner*—Joe Edell
(74) *Attorney, Agent, or Firm*—Robert R. Richardson, P.S.

(57) ABSTRACT

The present invention provides a ventilated seating system. The ventilated seating system provides a back rest portion including an upper end and a lower end and a perforated duct positioned adjacent to the lower end of the back rest portion. The ventilated seating system further provides a seat base portion including a front end and a back end with the back end positioned adjacent to the perforated duct, and wherein air is drawn across a surface of the seat base portion and a surface of the back rest portion without passing through the seat base and the back rest portions, and into the perforated duct. The ventilated seating system may utilize a pressure differential to draw the air into the duct. To enhance operation, the system may further include adjustable perforated ducts. The adjustable perforated ducts may be adjusted manually or mechanically.

45 Claims, 4 Drawing Sheets

VENTILATED SEATING SYSTEM WITH IMPROVED LOW PRESSURE PERFORMANCE

FIELD OF THE INVENTION

The technical field of this disclosure is ventilated seating systems, and, more particularly, seating systems with improved low-pressure ventilation performance.

BACKGROUND OF THE INVENTION

Ventilated seating systems are widely known throughout several industries such as, for example, vehicle manufacturing, heavy machinery manufacturing, and agricultural machinery manufacturing. Ventilated seats are used in these industries to provide a cooling effect to a seated individual by drawing away perspiration. The removal of the perspiration results in an increase in comfort of the seated individual.

A somewhat similar effect can be obtained utilizing personal air outlets. Personal air outlets are currently utilized in automobiles and aircraft. Unfortunately, these devices only provide ventilation and cooling effect to specific surfaces of a body exposed to these ventilation devices. Generally, when personal air devices are utilized, the torso and legs can remain uncomfortable.

In the aircraft industry, the advent of in-seat electronics devices has resulted in an undesirable increase in heat load within the passenger cabin. For example, whereas an average passenger produces approximately 70 W of sensible heat, in-seat electronics may produce as much as 40 W of additional sensible heat per passenger. Other industries, such as those mentioned above, have similar thermal load challenges due to other factors.

Increasing the output of a local air conditioning system can offset this additional heat load. Unfortunately, this solution typically results in significant additional cost and weight, and requires additional power to operate.

Yet another solution involves utilizing a ventilated seating system. Ventilated seating systems typically provide comfort to the passenger by carrying away air that contains heat and evaporated moisture from the local area. This solution provides a decreased temperature within the local area.

One such type of ventilated seating system includes moving air through a portion of a seat cushion utilizing a pressurized duct or volume called a plenum. This ventilated seating system provides a negative pressure or vacuum and air is drawn into and through the seat cushion to the air plenum. Alternatively, if a positive pressure is applied, air is forced through and out of the seat cushion.

Another type of ventilated seating system includes moving air through a plurality of perforated plastic tubing members that are deposited within a seat base and a seat back and connected to air vents within the seat base and the seat back. The perforated plastic tubing members are aligned so that air passes through the perforations to corresponding air vents within the seat base and the seat back.

Unfortunately, moving air through a seat cushion or through vents within the seat back or seat base requires the use of a fan or other device to produce the necessary vacuum or forced air flow. The addition of a device for creating the necessary vacuum or forced air flow is undesirable because it adds cost and complexity, increases electrical and thermal loads, adds weight, and increases noise.

It would be desirable, therefore, to provide a system that would overcome these and other disadvantages.

SUMMARY OF THE INVENTION

One aspect of the present invention provides a ventilated seating system with improved low-pressure performance. The ventilated seating system provides a back rest portion including an upper end and a lower end, and a perforated duct positioned adjacent to the lower end of the back rest portion. The ventilated seating system further provides a seat base portion including a front end and a back end with the back end positioned adjacent to the perforated duct, and wherein air is drawn across a surface of the seat base portion and a surface of the back rest portion without passing through the seat base and the back rest portions, and into the perforated duct.

In accordance with another aspect of the present invention, a method for ventilating a seating area is provided. The method provides for creating differential pressure between a seating area and a duct system. The method further provides for drawing air across a surface of a seat, without passing through a seat cushion, into the duct system based on the pressure differential.

In accordance with yet another aspect of the invention, a system for ventilating a seating area is provided. The system includes means for creating differential pressure between a seating area and a duct system. Means for drawing air across a surface of a seat, without passing through a seat cushion, into the duct system based on the pressure differential is also provided.

The present invention provides numerous advantages over current industry practices. The invention allows a passenger to adjust airflow thereby providing individual comfort. Additionally, when practicing the invention, heat extraction reduces the heat load of an environmental cooling system. Finally, the present invention provides for bio-effluent extraction as well.

The foregoing and other features and advantages of the invention will become further apparent from the following detailed description of the presently preferred embodiment, read in conjunction with the accompanying drawings. The scope of the invention is defined by the appended claims and equivalents thereof, the detailed description and drawings being merely illustrative of the invention rather than limiting the invention.

DETAILED DESCRIPTION OF THE PRESENTLY PREFERRED EMBODIMENT

Throughout the specification, and in the claims, the term "connected" means a direct connection between components or devices that are connected without any intermediate devices. The term "coupled" means either a direct connection between components or devices that are connected, or an indirect connection through one or more passive or active intermediary devices.

Figure 1A:
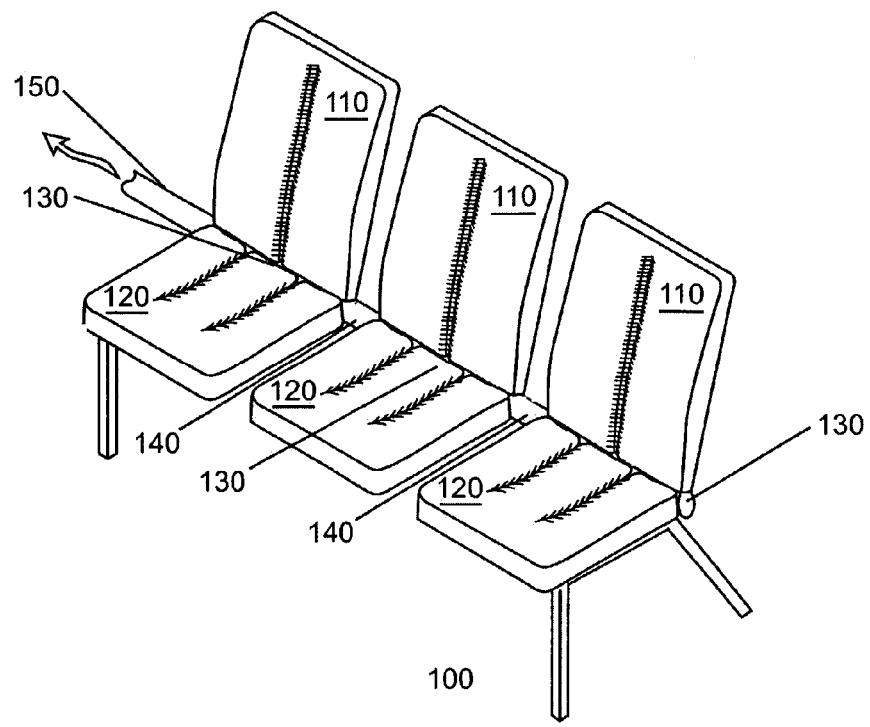
FIG. 1A is a perspective diagram illustrating a ventilated seating system according to an embodiment of the present invention.
Figure 1B:
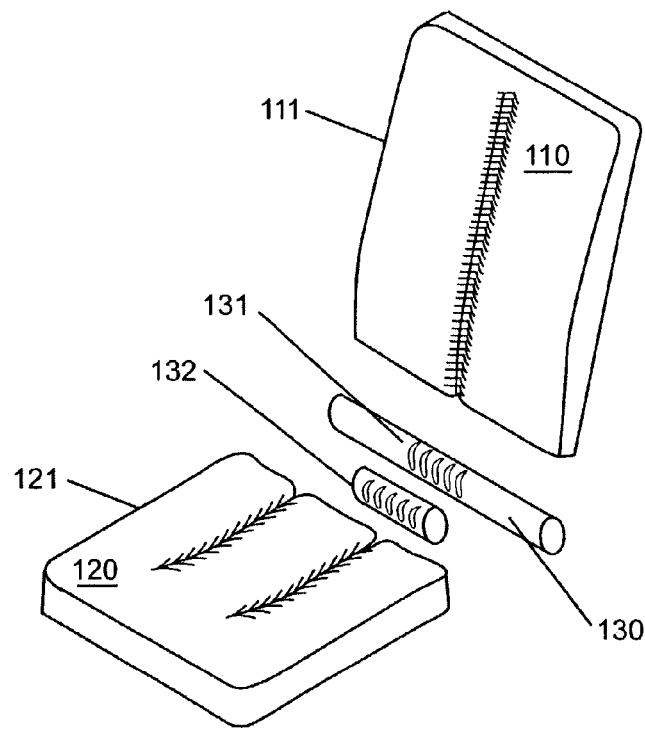
FIG. 1B is an exploded view illustrating elements of the ventilated seating system of FIG. 1A.

FIG. 1A is a perspective diagram illustrating a ventilated seating system 100 according to one embodiment of the present invention. In this example, ventilated seating system 100 is implemented as a commercial aircraft seating system. In other examples, ventilated seating system 100 is implemented as a passenger compartment ventilation system of an automobile, a truck, an industrial machine, a mass transit system, or an agricultural machine. FIG. 1B is an exploded view illustrating elements of the ventilated seating system of FIG. 1A.

Ventilated seating system 100 includes back rest portions 110 and seat base portions 120. Each back rest portion 110 is coupled to an associated seat base portion 120. In one embodiment, each back rest portion 110 includes an upper end and a lower end and a back support surface arranged to support a back of a passenger seated thereagainst, and each seat base portion 120 includes a front end and a back end and a seating surface arranged to receive a passenger seated thereon. In this embodiment, the lower end of the back rest portion 110 is coupled to the back end of the seat based portion 120.

In another embodiment, channels (111 and 121) are formed into the material of seat back 110 and seat base 120 respectively. In this embodiment, the channels improve ventilation performance. In an example, the channels are implemented as deep grooves, such as, for example illustrated in FIG. 1B. In this example, a seated occupant's back or legs form one side of a duct, and the seat material forms the other side. These channels may be simple lines (shown) or may be more complex branching patterns.

Ventilated seating system 100 further includes perforated duct 130, positioned adjacent to the back support surfaces of the back rest portions 110 and the seating surfaces of the seat based portions 120. Each perforated duct includes a number of slots, openings, or perforations 131 arranged in distinct areas of the perforated duct. The perforations provide communication between the area surrounding the seat occupant and the ventilated seating system 100. In one embodiment and referring to FIGS. 3A and 3B, perforated duct 130 is adjustable, such as by designing duct 130 to rotate within sleeve 140 so as to expose more or less of the perforations 131 to the seated occupant.

In one embodiment, airflow through perforated duct 130 is controlled with an external valve (not shown), to increase or decrease ventilation as desired by the seat occupant. In another embodiment, when multiple seats are ventilated, the perforated ducts 130 are connected together utilizing sleeves 140.

In yet another embodiment, the airflow to each seat may be individually controlled, for example, by the use of an optional perforated shutter 132. In this embodiment, each perforated duct 130 can be adjusted to increase or decrease airflow into the ventilated seating system 100. In one example, adjustable perforated duct 130 is manually adjustable. In another example, adjustable perforated duct 130 is mechanically adjustable.

Perforated ducts 130 can be manufactured from any material suitable for a specified application. In an example and referring to an aircraft application, suitable material for producing perforated ducts 130 includes fire resistant plastics such as ULTEM available from DuPont of Wilmington, Del. In another example and again referring to an aircraft application, suitable material for producing perforated ducts 130 includes thin aluminum such as, for example thin aluminum of 0.02″ thickness. In yet another example and referring to a mass transit application, suitable material for producing perforated ducts 130 includes nylon or other similar materials.

Duct 150 is positioned to provide communication between ventilated seating system 100 and a ventilation system (not shown). In one embodiment, the ventilation system is an existing ventilation system, such as, for example a cabin ventilation system of an aircraft, a passenger compartment ventilation system of an automobile, a truck, an industrial machine, a mass transit system, or an agricultural machine.

In operation, a pressure differential is created between a ventilation system (not shown) and ventilated seating system 100. The pressure differential creates a vacuum within the perforated ducts 130 of ventilated seating system 100. The resulting vacuum, within the perforated ducts 130, draws air from the area surrounding the seat occupant into the ventilated seating system 100.

Figure 2A:
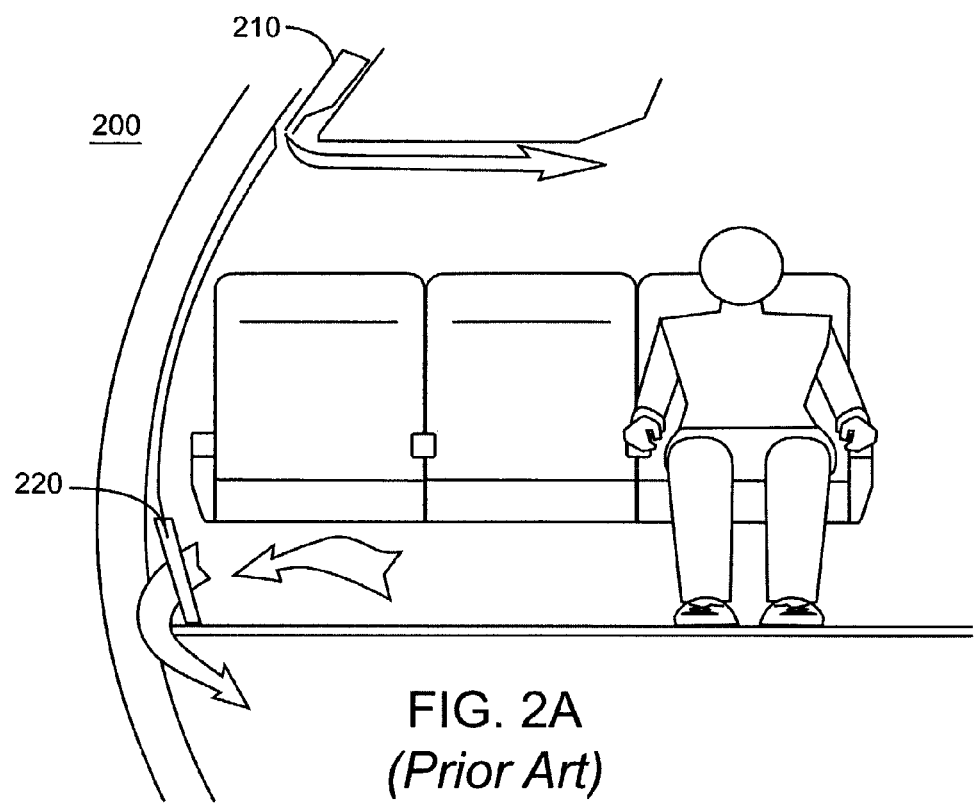
FIG. 2A is a front elevational view illustrating airflow within a aircraft passenger cabin.
Figure 2B:
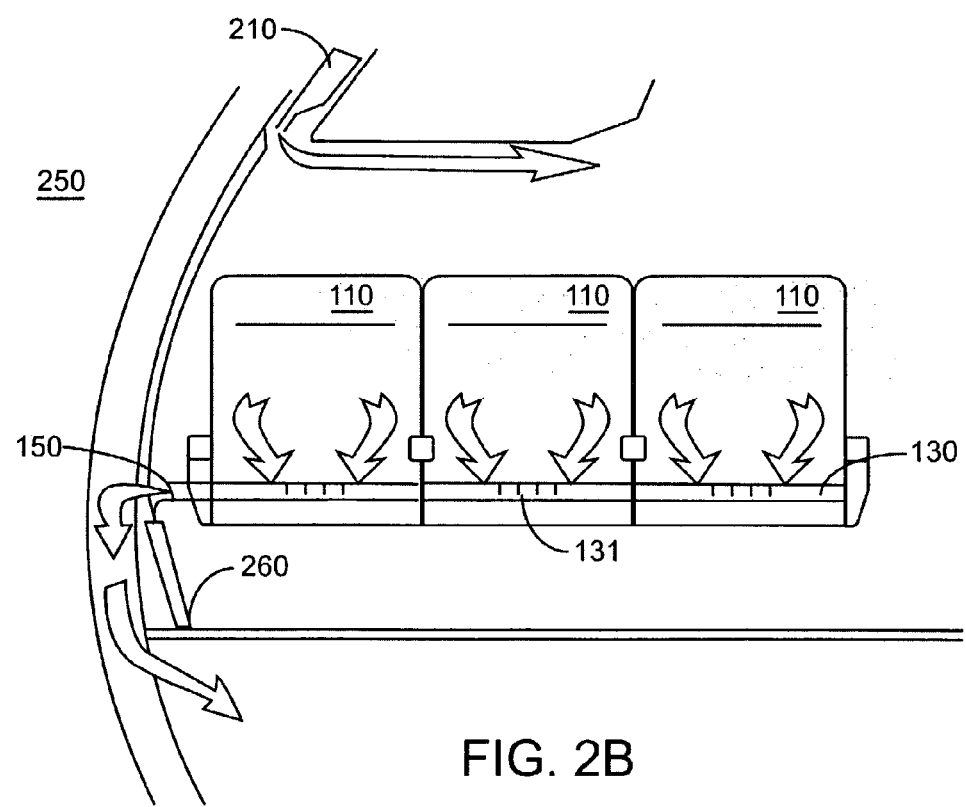
FIG. 2B is a front elevational view illustrating air flow within a ventilated seating system according to an embodiment of the present invention.

FIGS. 2A and 2B are side elevational views illustrating contrasting airflow of ventilated seating systems within an aircraft passenger cabin according to a conventional system and according to an embodiment of the present invention. Like components from FIG. 1 and FIGS. 2A and 2B are labeled identically.

FIG. 2A illustrates air flow within a conventional aircraft passenger cabin. FIG. 2A illustrates a typical aircraft ventilation flow system 200 in a passenger region within the conventional aircraft passenger cabin. Air is supplied by an aircraft environmental control system (ECS) through overhead nozzle 210, and is exhausted from the region through return air grille 220. Return air grille 220 additionally serves to provide vent area in the event of a sudden aircraft decompression.

FIG. 2B illustrates air flow within an aircraft passenger cabin, including a ventilated seating system 250, according to an embodiment of the present invention. In one embodiment, ventilated seating system 250 is implemented as a commercial aircraft seating system row within an aircraft passenger cabin.

FIG. 2B details airflow within a portion of an environmental control system (ECS) implementing the present invention. In FIG. 2B, a majority portion of air flows from ECS through overhead nozzle 210 and is exhausted from the region through duct 150. The air flows from overhead nozzle 210 to the area surrounding the seat occupant and is drawn across back rest portions 110 and seat base portions 120 (detailed in FIG. 1, above) into the perforated duct 130.

Return air grille 220 is replaced with decompression panel 260. In one embodiment, decompression panel 260 is partially sealed. In another embodiment, decompression panel 260 is completely sealed. Decompression panel 260 retains the decompression function of return air grille 220, but limits, or completely prevents airflow through decompression panel 260 during operation.

Because decompression panel 260 blocks or partially blocks return airflow, airflow is forced through ventilated seating system 250. Forcing the air through ventilated seating system 250 creates a pressure differential within the ECS. The pressure differential within the ECS allows ventilated seating system 250 to remove heat, moisture, and odors from the area around the passenger. The pressure differential is dependent on configuration of ventilated seating system 250, configuration of the passenger cabin, as well as air flow through other venting systems.

In one embodiment, pressure differential can be adjusted by reducing or increasing airflow through the other venting systems. In another embodiment, pressure differential increases by reducing the air flow through decompression panel 260. In this embodiment, when air flow through decompression panel 260 is reduced or eliminated, air flow through ventilated seating system 200 increases proportionally.

Figure 3A:
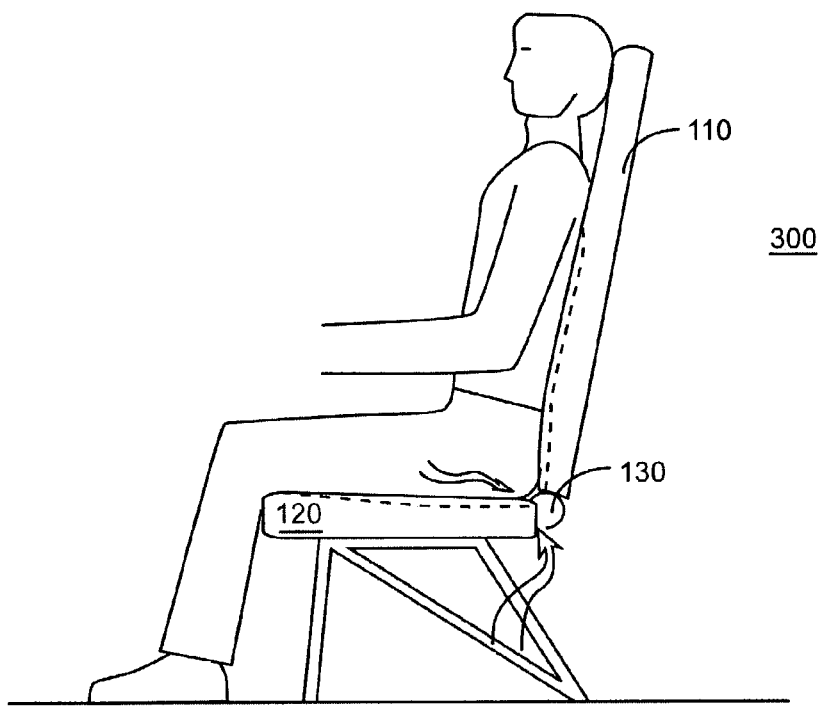
FIG. 3A is a side elevational view illustrating adjustment of volumetric airflow of a ventilated seating system according to an embodiment of the present invention.
Figure 3B:
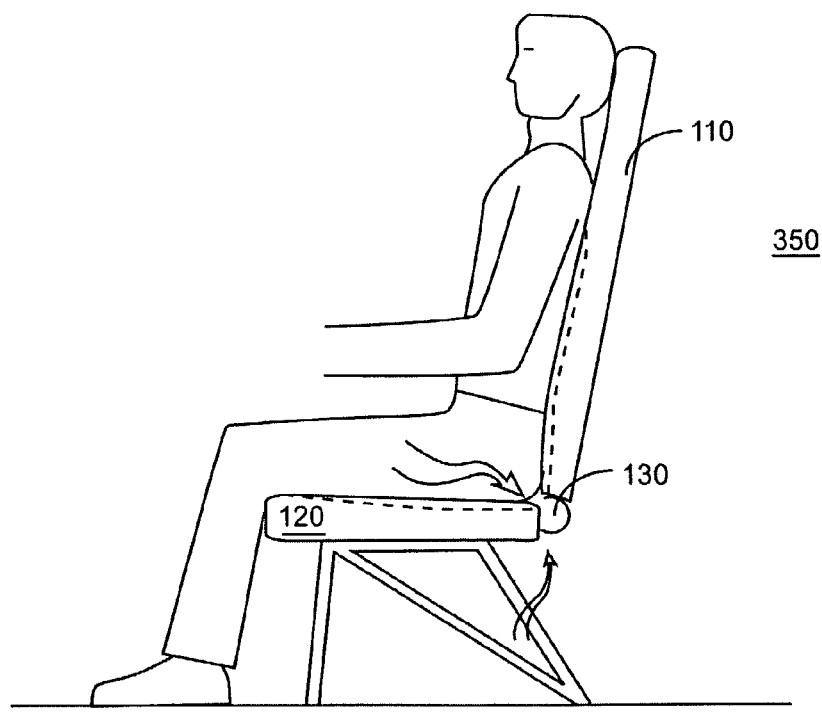
FIG. 3b is a side elevational view illustrating adjustment of volumetric airflow of a ventilated seating system according to another embodiment of the present invention.

FIGS. 3A and 3B are side elevational views illustrating adjustment of volumetric airflow of a ventilated seating system according to an embodiment of the present invention. Like components from FIG. 1 and FIGS. 3A and 3B are labeled identically.

FIG. 3A illustrates airflow through ventilated seating system 300 via adjustable perforated duct 130. In this embodiment, perforated duct 130 is positioned to provide minimal air flow from an area immediately surrounding a seat occupant. Simultaneously, maximum air flow from an area surrounding seat system 300 but not affecting the seat occupant is provided as well. In an example, positioning adjustable perforated duct 130 to provide minimal air flow provides bio-effluent removal from the area surrounding the seat occupant without noticeable temperature variation.

FIG. 3B illustrates airflow through ventilated seating system 350 via perforated duct 130. In this embodiment, perforated duct 130 is positioned to provide maximum air flow from the area immediately surrounding the seat occupant. Simultaneously, minimal air flow from the area surrounding seat system 300 but not affecting the seat occupant is provided as well. In an example, positioning perforated duct 130 to provide maximum airflow provides maximum cooling as well as bio-effluent removal from the area surrounding the seat occupant.

In these embodiments and referring to FIG. 1 above, ventilation to each seating system (100 and 300) is varied by designing duct 130 to rotate within sleeve 140 so as to expose more or less of the perforations 131 to the seated occupant.

Many applications require a constant pressure within a specific area, such as a cabin within an aircraft or a passenger compartment of an automobile. Therefore, positioning unused portions of the adjustable perforated ducts 130 to draw air from the area surrounding the seat system allows an environmental control system (ECS) to maintain constant pressure throughout the passenger area.

Figure 4:
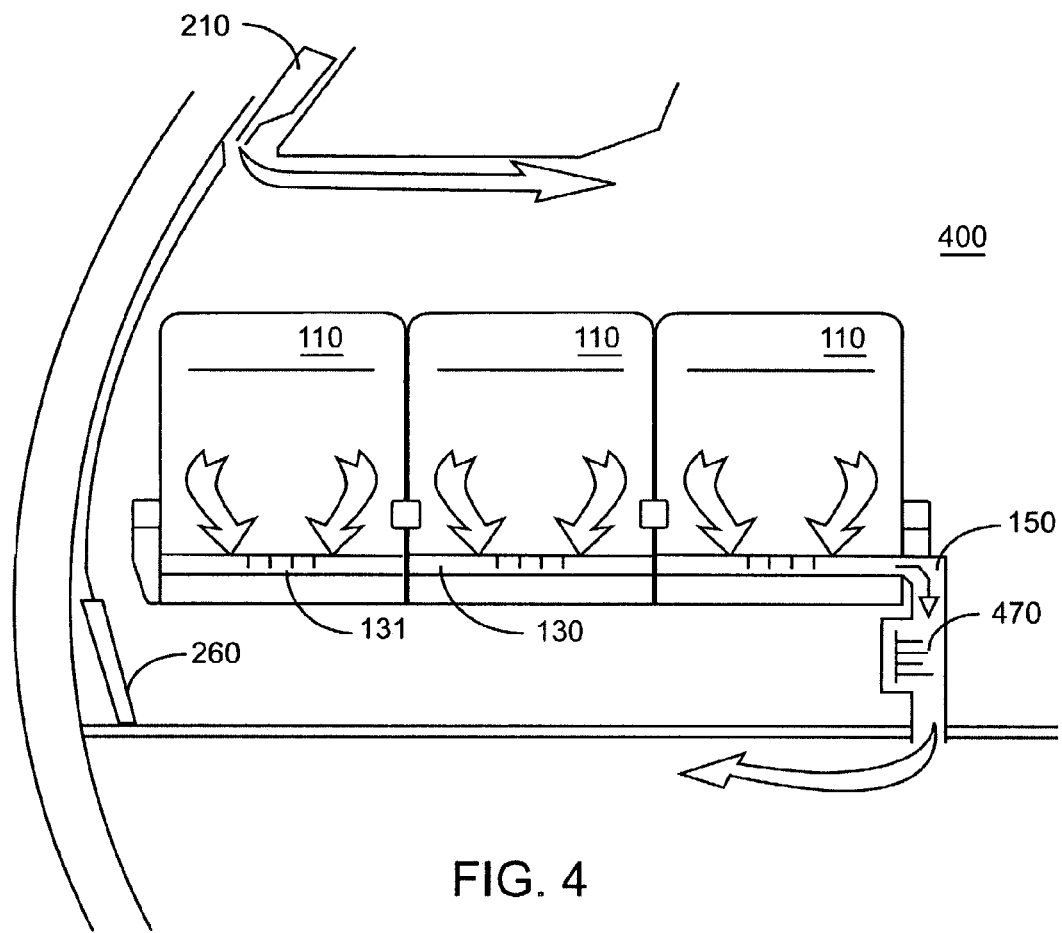
FIG. 4 is a front elevational view illustrating air flow within a ventilated seating system according to yet another embodiment of the present invention.

FIG. 4 is a front elevational view illustrating air flow within a ventilated seating system according to yet another embodiment of the present invention. In one embodiment, ventilated seating system 400 is implemented as a commercial aircraft seating system row within an aircraft. Like components from FIGS. 1, 2, and 4 are labeled identically.

FIG. 4 details air flow within a portion of an environmental control system (ECS). Within seating system 400, air flows from the area surrounding the seat occupant and is drawn across the back rest portions 110 and the seat base portions 120 (detailed in FIG. 1, above) through duct assembly 130 and into a ventilation system.

FIG. 4 further details airflow within seating system 400. In one embodiment, seating system 400 includes an optional in-seat electronics unit 470. In an example, in-seat electronics unit 470 is implemented as an in-flight electronic (IFE) unit.

In this embodiment, seating system 400 utilizes airflow to cool optional in-seat electronic unit 470. The in-seat electronics are cooled and passenger and electronic heat load is removed from the cabin when utilizing this configuration. The result is an increase in cabin cooling efficiency as well as an increase in passenger comfort.

Figure 5:
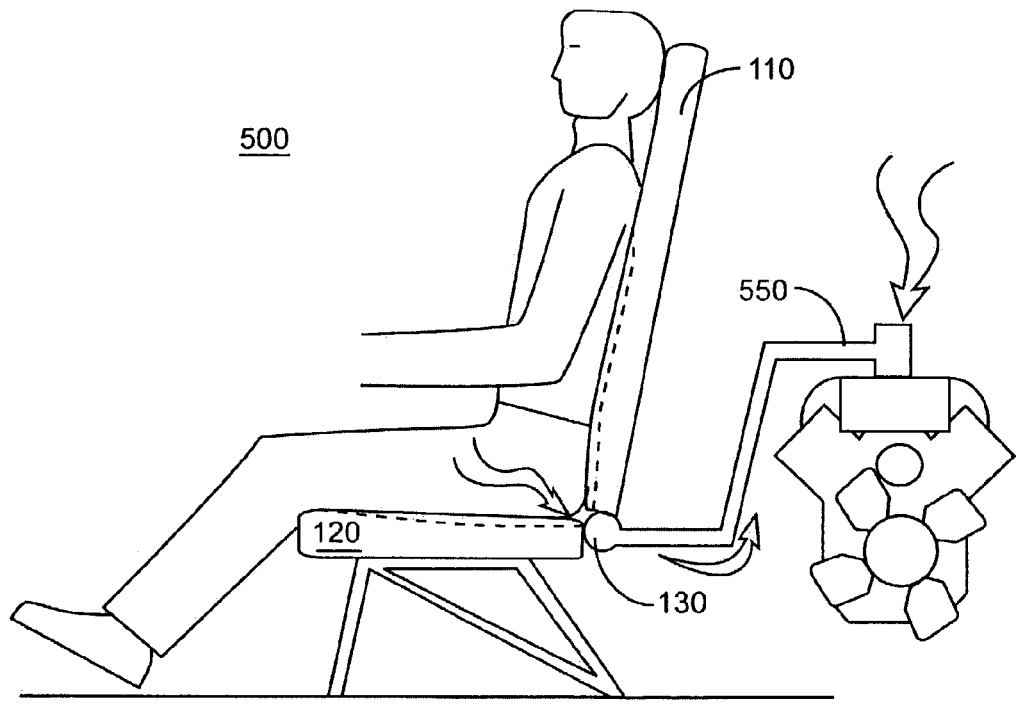
FIG. 5 is a front elevational view illustrating a ventilated seating system according to another embodiment of the present invention.

FIG. 5 is a front elevational view illustrating a ventilated seating system according to another embodiment of the present invention. In one embodiment, ventilated seating system 500 is implemented as an automobile seating system, such as, for example within a mid-engine automobile design. Like components from FIGS. 1 and 5 are labeled identically.

Within seating system 500, duct 550 connects perforated duct 130 to an engine air intake. This configuration allows a portion of the air drawn into the engine to be provided from seating system 500. A check valve (not shown) is required to prevent backflow from the engine into the seat. In this embodiment, engine vacuum provides differential pressure to ventilate seating system 500.

The above-described ventilated seating system having improved low pressure performance is an example system. The ventilated seating system illustrates one possible approach for improving low pressure performance. The actual implementation may vary from the ventilated seating system discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

What is claimed is:

1. A ventilated seating system comprising:
    a back rest portion including an upper end and a lower end and having a back support surface arranged to support a back of a passenger seated thereagainst;
    an adjustable perforated duct positioned adjacent to the lower end of the back rest portion; and
    a seat base portion including a front end and a back end and having a seating surface arranged to receive a passenger seated thereon, the back end positioned adjacent to the perforated duct;
    wherein a first flow of air is drawn across the seating surface of the seat base portion and the back support surface of the back rest portion and into the perforated duct without passing through the seat base and the back rest portions and a second flow of air is drawn into the perforated duct without passing through the seat base and the backrest portions from an area surrounding the seating system without affecting an occupant of the seating system, the adjustable perforated duct being adjustable such that increasing the first flow of air causes the second flow of air to be decreased and decreasing the first flow of air causes the second flow of air to be increased.

2. The ventilated seating system of claim 1, wherein the back rest portion and the seat base portion include channels to enhance airflow into the perforated duct.

3. The ventilated seating system of claim 1, wherein the system is utilized in a vehicle selected from a group consisting of: an automobile, a truck, an industrial machine, an agricultural machine, and an aircraft.

4. The ventilated seating system of claim 1, wherein the air is drawn into the perforated duct due to a pressure differential.

5. The ventilated seating system of claim 1, wherein the perforated duct is rotatably adjusted.

6. The ventilated seating system of claim 5, wherein the perforated duct includes a rotatable portion that is rotatable to increase or decrease communication of perforations formed in the perforated duct with cabin air.

7. The ventilated seating system of claim 1, wherein the perforated duct interfaces with a ventilation system.

8. The ventilated seating system of claim 1, further comprising:
at least one additional back rest portion; and
at least one additional seat base portion; wherein the back rest portions and the seat base portions are positioned in a row; and wherein the perforated duct is positioned adjacent to the lower end of the back rest portions of the row.

9. The ventilated seating system of claim 8, wherein the perforated duct includes a plurality of adjustable perforated duct portions.

10. The ventilated seating system of claim 9, wherein the adjustable perforated duct portions are coupled together utilizing a sleeve to form the perforated duct.

11. The ventilated seating system of claim 9, wherein the adjustable perforated duct is selected from a group consisting of manually rotatable perforated duct and mechanically rotatable perforated duct.

12. The ventilated seating system of claim 11, wherein at least one rotatable portion of the adjustable perforated duct are rotatable to increase or decrease communication of perforations formed in the perforated ducts with cabin air.

13. A method of ventilating a seating area, the method comprising:
creating a pressure differential between a seating area and a duct system;
drawing a first flow of air across a seating surface of a seat arranged to receive a passenger seated thereon into an inlet of the duct system that is located adjacent the seating surface based on the pressure differential without passing through a seat cushion;
drawing a second flow of air into the inlet of the duct system without passing through a seat cushion from an area surrounding the seat without affecting a passenger seated thereon; and
adjusting the inlet of the duct system such that increasing the first flow of air causes the second flow of air to be decreased and decreasing the first flow of air causes the second flow of air to be increased.

14. The method of claim 13 wherein creating the pressure differential comprises:
reducing air flow through a decompression system; and
providing an air flow route to a ventilation system via the duct system.

15. A system for ventilating a seating area, the system comprising:
means for creating differential pressure between a seating area and a duct system;
means for drawing a first flow of air across a seating surface of a seat arranged to receive a passenger seated thereon into an inlet of the duct system that is located adjacent the seating surface based on the pressure differential without passing through a seat cushion;
means for drawing a second flow of air into the inlet of the duct system without passing through a seat cushion from an area surrounding the seat without affecting a passenger seated thereon; and
means for adjusting the first and second flows of air such that increasing the first flow of air causes the second flow of air to be decreased and decreasing the first flow of air causes the second flow of air to be increased.

16. The system of claim 15, further comprising:
means for reducing air flow through a decompression system.

17. The system of claim 15, further comprising:
means for providing an air flow route to a ventilation system via the duct system.

18. The ventilated seating system of claim 15, wherein the system is utilized in a vehicle selected from a group consisting of: an automobile, a truck, an industrial machine, an agricultural machine, and an aircraft.

19. A vehicle ventilation system comprising:
an air supply to an interior of a vehicle; and
at least one ventilated seating system including:
a back rest portion in pneumatic communication with the interior of the vehicle, the back rest portion including an upper end and a lower end and having a back support surface arranged to support a back of a passenger seated thereagainst;
an adjustable perforated duct positioned adjacent to the lower end of the back rest portion; and
a seat base portion in pneumatic communication with the air supply to the interior of the vehicle, the seat base portion including a front end and a back end and having a seating surface arranged to receive a passenger seated thereon, the back end positioned adjacent to the perforated duct
wherein a first flow of air is drawn across the seating surface of the seat base portion and the back support surface of the back rest portion and into the perforated duct without passing through the seat base and the back rest portions and a second flow of air is drawn into the perforated duct without passing through the seat base and the backrest portions from an area surrounding the seating system without affecting an occupant of the seating system, the adjustable perforated duct being adjustable such that increasing the first flow of air causes the second flow of air to be decreased and decreasing the first flow of air causes the second flow of air to be increased.

20. The system of claim 19, further comprising an air exhaust system from the interior of the vehicle in pneumatic communication with the perforated duct.

21. The system of claim 20, wherein the vehicle includes an aircraft.

22. The system of claim 21, wherein the air exhaust system includes a decompression panel.

23. The system of claim 22, wherein the decompression panel is configured to at least partially seal the interior of the vehicle from the air exhaust system.

24. The system of claim 22, wherein the decompression panel is configured to substantially completely seal the interior of the vehicle from the air exhaust system.

25. The system of claim 19, wherein the back rest portion and the seat base portion include channels to enhance airflow into the perforated duct.

26. The system of claim 19, wherein the air is drawn into the perforated duct due to a pressure differential.

27. The system of claim 19, wherein the perforated duct is rotatably adjusted.

28. The system of claim 27, wherein the perforated duct includes a rotatable portion that is rotatable to increase or decrease communication of perforations formed in the perforated duct with cabin air.

29. The system of claim 19, further comprising:
at least one additional back rest portion; and
at least one additional seat base portion, wherein the back rest portions and the seat base portions are positioned in a row, and wherein the perforated duct is positioned adjacent to the lower end of the back rest portions of the row.

30. The system of claim 29, wherein the perforated duct includes a plurality of adjustable perforated duct portions.

31. The system of claim 30, wherein the adjustable perforated duct portions are coupled together utilizing a sleeve to form the perforated duct.

32. The system of claim 30, wherein the adjustable perforated duct is selected from a group consisting of: manually rotatable perforated duct and mechanically rotatable perforated duct.

33. The system of claim 32, wherein at least one rotatable portion of the adjustable perforated duct is rotatable to increase or decrease communication of perforations formed in the perforated ducts with cabin air.

34. A ventilated seat for an aircraft, the aircraft having an air supply system and a return air system, the seat comprising:
a back rest portion having a back support surface arranged to support a back of a passenger seated thereagainst in pneumatic communication with an interior of an aircraft;
a seat base portion having a seating surface arranged to receive a passenger seated thereon in pneumatic communication with the interior of the aircraft; and
an adjustable intake vent pneumatically communicable with a return air system of the aircraft and with the back rest portion and the seat back portion and with an area surrounding the seat that does not affect a passenger seated thereon, wherein a first flow of air is drawn across the seating surface of the seat base portion and the back support surface of the back rest portion and into the intake vent without passing through the seat base and the back rest portions and a second flow of air is drawn into the intake vent without passing through the seat base and the backrest portions from the area surrounding the seat that does not affect a passenger seated thereon, the adjustable intake vent being adjustable such that increasing the first flow of air causes the second flow of air to be decreased and decreasing the first flow of air causes the second flow of air to be increased.

35. The seat of claim 34, wherein the back rest portion and the seat base portion include channels to enhance airflow into the intake vent.

36. The seat of claim 34, wherein the air is drawn into the intake vent due to a pressure differential.

37. The seat of claim 34, wherein the intake vent includes a perforated duct.

38. The seat of claim 37, wherein the perforated duct is rotatably adjusted.

39. The seat of claim 38, wherein the perforated duct includes a rotatable portion that is rotatable to increase or decrease communication of perforations formed in the perforated duct with cabin air.

40. The seat of claim 34, further comprising:
at least one additional back rest portion; and
at least one additional seat base portion, wherein the back rest portions and the seat base portions are positioned in a row, and wherein the intake vent is positioned adjacent to the lower end of the back rest portions of the row.

41. The seat of claim 40, wherein the intake vent includes a perforated duct that defines a plurality of adjustable perforated duct portions.

42. The seat of claim 41, wherein the adjustable perforated duct portions are coupled together utilizing a sleeve to form the perforated duct.

43. The seat of claim 41, wherein the adjustable perforated duct is selected from a group consisting of: manually rotatable perforated duct and mechanically rotatable perforated duct.

44. The seat of claim 43, wherein at least one rotatable portion of the adjustable perforated duct is rotatable to increase or decrease communication of perforations formed in the perforated ducts with cabin air.

45. A method of ventilating an aircraft cabin, the method comprising:
supplying air to a cabin of an aircraft having a plurality of seats, each seat having a seating surface arranged to receive a passenger seated thereon and a back support surface arranged to support a back of a passenger seated thereagainst;
at least partially restricting return air flow from the cabin of the aircraft such that a differential pressure is created between return air piping and a plurality of the seating surfaces and back support surfaces in the cabin of the aircraft; and
flowing a first flow of air from the plurality of the seating surfaces and back support surfaces into a plurality of inlets of the return air piping disposed adjacent the plurality of the seating surfaces and back support surfaces responsive to the differential pressure without the first flow of air passing through the plurality of seating surfaces or the back support surfaces; and
flowing a second flow of air into the plurality of inlets of the return air piping from a plurality of areas surrounding the plurality of seats that do not affect passengers seated thereon without the second flow of air passing through the plurality of seating surfaces or the back support surfaces, the first and second flows of air being adjustable such that increasing the first flow of air causes the second flow of air to be decreased and decreasing the first flow of air causes the second flow of air to be increased.

* * * * *